United States Patent

[11] 3,593,063

| [72] | Inventor | David T. Cavil |
| | | Menomonee Falls, Wis. |
| [21] | Appl. No. | 824,496 |
| [22] | Filed | May 14, 1969 |
| [45] | Patented | July 13, 1971 |
| [73] | Assignee | Outboard Marine Corporation |
| | | Waukegan, Ill. |

[54] CHARGE REGULATOR FOR CAPACITOR IGNITION SYSTEM
5 Claims, 1 Drawing Fig.

[52] U.S. Cl. .................... 317/16, 317/31, 317/33
[51] Int. Cl. ..................... H02h 3/20
[50] Field of Search ............ 317/16, 31, 33 SC, 33 R; 307/108, 130; 320/DIG. 2

[56] References Cited
UNITED STATES PATENTS

| 3,278,823 | 10/1966 | Ross | 320/SCR |
| 3,436,639 | 4/1969 | Burkett et al. | 320/SCR |
| 3,454,860 | 7/1969 | Burkett et al. | 320/SCR |

Primary Examiner—James D. Trammell
Attorneys—Robert K. Gerling, Robert E. Clemency, John W. Michael, Gerrit D. Foster, Bayard H. Michael, Paul R. Puerner, Joseph A. Gemignani, Andrew O. Riteria and Spencer B. Michael ABSTRACT: Disclosed herein is a charge regulator for a storage capacitor in a capacitive discharge ignition system. The charge regulator includes a switching device in the form of a thyristor and a zener diode. The thyristor is in parallel with the storage capacitor and the output terminals of a charging coil. When the charge on the capacitor reaches a predetermined maximum safe value, the thyristor will become conducting and switch a loading resistor into a shunt path across the output terminals of the charging coil to maintain the charge on the capacitor below the predetermined maximum value.

PATENTED JUL 13 1971 3,593,063
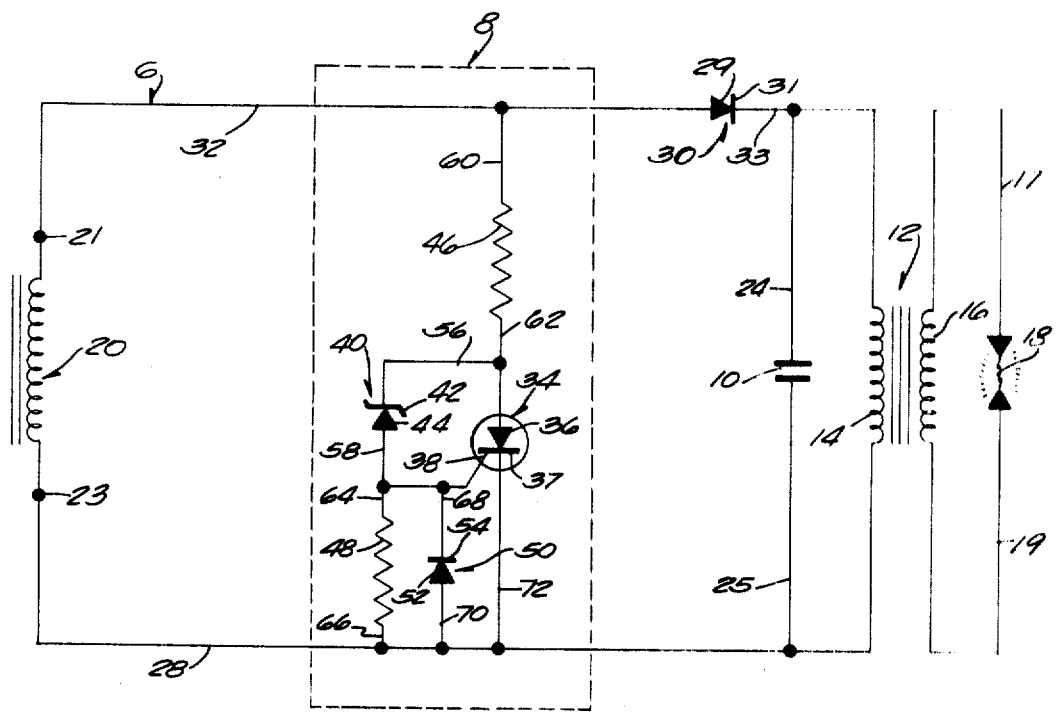
Inventor
David T. Cavil
By
Wheeler, Wheeler, House & Clemency
Attorneys 3,593,063

1

CHARGE REGULATOR FOR CAPACITOR IGNITION SYSTEM

BACKGROUND OF THE INVENTION

The invention relates to regulating the charge on a storage capacitor in capacitor discharge ignition systems to prevent damage to the capacitor.

SUMMARY OF THE INVENTION

The invention provides a circuit for regulating the charge voltage of a storage capacitor in a capacitive discharge ignition system. Regulation is accomplished by using a thyristor to switch a loading resistor across the output terminals of a capacitor charging device. A zener diode is connected to the thyristor. When the voltage across the capacitor reaches the zener voltage of the zener diode, the zener diode passes a current which forward biases the thyristor to make it conducting and thus connects the loading resistor across the output terminals of the capacitor charging device to limit the voltage output of the charging device.

It is an object of the invention to provide a circuit for regulating the charge on a storage capacitor in an ignition system to prevent overcharging of the capacitor and breakdown of the capacitor.

It is a further object of the invention to provide a charge regulator for a storage capacitor which uses semiconductor components to provide a shunt path across the output of the capacitor charging device to limit the charge voltage to a predetermined safe value.

Further objects and advantages of the present invention will become apparent from the following description and accompanying drawings.

DRAWING

The FIGURE is a schematic diagram of a charge regulating circuit which is in accordance with the invention and which is employed in a capacitor discharge ignition system.

DETAILED DESCRIPTION

The FIGURE discloses a capacitor discharge ignition system which is generally designated 6 and which includes the capacitor charge regulating circuit of the invention which is enclosed in the broken line rectangle designated 8. The ignition circuit includes a storage capacitor 10, an ignition transformer 12 having a primary coil 14 and a secondary coil 16 and a spark plug 18. The secondary coil 16 is connected to the spark plug 18 by leads 17 and 19.

The circuit also includes a capacitor charging device 20 in the form of a charging coil having first and second output terminals 21 and 23. One side of the capacitor is connected to one side of the primary coil 14 by a lead 24 and the other side of the capacitor is connected to the other terminal of the primary coil 14 by a lead 25. One side of the capacitor 10 is also connected to the second output terminal 23 by a lead 28. The circuit also includes a diode 29 which has an anode 30 and a cathode 31. The anode is connected to the first output terminal 21 by a lead 32. The cathode 31 of diode 30 is connected to the other side of capacitor 10 by a lead 33.

In accordance with the invention, the charge regulating circuit includes semiconductor switch means which is responsive to an increase in potential across the capacitor 10 beyond a predetermined value to close a shunt path across the output terminals 21 and 23 to limit the potential across the output terminals and thus the charging potential applied to the capacitor 10. As disclosed, the semiconductor switch means comprises a thyristor 34 which has an anode 36, a cathode 37 and a gate 38. The switch means also includes a zener diode 40 which has a cathode 42 and an anode 44.

The charge regulating circuit also includes a first resistor or loading resistor 46 and a second resistor 48. The semiconductor switch means also includes a diode 50 which has an anode

2

52 and a cathode 54. The cathode 42 of the diode 40 is connected to the anode 36 of the thyristor 34 by a lead 56. The cathode of the diode 40 is connected to the gate 38 by a lead 58. One side of the resistor 46 is connected by a lead 60 to lead 32 which is connected to the first output terminal 21. The outer side of the resistor 46 is connected to the anode 36 of the thyristor 34 by a lead 62. One side of the resistor 48 is connected to the gate 38 of the thyristor 34 by a lead 64, and the other side of the resistor 48 is connected to lead 28 by a lead 66.

The diode 50 is connected to the gate 38 of the thyristor 34 by a lead 68 which is connected to the cathode 54. The anode 52 of the diode 50 is connected to the second output terminal 23 by a lead 70. The cathode 37 of the thyristor 34 is connected to the second output terminal 23 by a lead 72, which is connected to lead 28.

In operation of a circuit of the invention, when the output terminal 21 is electrically biased more positive than the output terminal 23, a charging current is delivered to the capacitor 10 through the diode 29. As the potential across the capacitor 10 rises to the maximum safe level which is determined by the zener voltage of the zener diode 40, the zener diode passes a current which forward biases the gate 38 of thyristor 34 and makes the thyristor conducting, thus switching the loading resistor 46 into a shunt path across the terminals 21 and 23 to reduce and maintain the voltage across the terminals 21 and 23 below the safe predetermined potential value. When the thyristor 34 is conducting, the voltage across the zener diode 40 drops below the zener voltage and the zener stops conducting.

With the circuit of the invention, no loading of the charging coil 20 occurs until the zener voltage is reached. When the terminal 23 becomes positive with respect to the terminal 21, the forward current through thyristor 34 stops and it becomes nonconducting. The charging device 20, however, is shunted by the load resistor 46 as soon as the terminal 23 becomes positive by virtue of the current path through diode 50.

One embodiment of the invention utilizes the following values for the various components: for the diode 40, a 1 watt zener diode with a 200 volt rating; for resistor 48, a one-half watt resistor having a resistance of 100 ohms; for resistor 46, a 20 watt resistor having a resistance of 4000 ohms; for thyristor 34, an 8 ampere thyristor having a 400 volt working voltage for diode 30; for diode 30, a 1 ampere 800 volt diode; for storage capacitor 10, a 1 microfarad 400 working volt capacitor; for diode 50, a 1 ampere 100 volt diode.

Various of the features of the invention will be found in the following claims.

I claim:

1. An ignition circuit comprising a capacitor charging device having first and second output terminals, a capacitor, a thyristor having an anode, cathode and gate, a first diode having an anode and cathode and having zener characteristics, a lead connecting said second output terminal to said cathode of said thyristor, a first resistor, a lead connecting said anode of said thyristor to one side of said first resistor, a lead connecting the other side of said first resistor to said first output terminal, a second diode having an anode and cathode, a lead connecting the anode of said second diode to said first output terminal, a lead connecting the cathode of said second diode to one side of said capacitor, a lead connecting the other side of said capacitor to the cathode of said thyristor, a lead connecting the cathode of said first diode to the anode of said thyristor, a lead connecting the anode of said first diode to said gate of said thyristor, a second resistor, a lead connecting one side of said second resistor to the gate of said thyristor, a lead connecting the other side of said second resistor to said second output terminal, a third diode having an anode and a cathode, a lead connecting said cathode of said third diode to said gate of said thyristor, and a lead connecting said anode of said third diode to said second output terminal.

2. A circuit in accordance with claim 1 in combination with an ignition coil having a primary and secondary, with said primary connected to said storage capacitor.

3. A capacitor discharge ignition system including a storage capacitor connected to the primary of an ignition transformer, a capacitor charging device having first and second terminals, one of said terminals of said charging device being connected to one terminal of said capacitor, a first diode having an anode and cathode with said anode being connected to the other of said terminals of said charging device and said cathode being connected to the other terminal of said capacitor, a thyristor having an anode, a cathode and gate, a zener diode having an anode and a cathode, said anode of said zener diode being connected to said gate of said thyristor, said cathode of said zener diode being connected to said anode of said thyristor, said anode of said thyristor being connected to said anode of said first diode, said cathode of said thyristor being connected to said one terminal of said capacitor, and a second diode having an anode and cathode, said cathode of said second diode being connected to said gate of said thyristor and said anode being connected to said one terminal of said charging device.

4. An ignition circuit comprising an ignition coil having a primary and a secondary, a capacitor charging device delivering alternating current and having first and second terminals, a storage capacitor connected to said terminals and to said primary, a shunt path across said terminals of said charging device and in parallel with said storage capacitor, and semiconductor switch means in said shunt path for closing said shunt path across said terminals to limit the potential applied to said capacitor to a predetermined value and including a zener diode and a thyristor having a gate connected to said zener diode for supply of current to said gate in response to the application to said zener diode of a potential above said predetermined level, whereby to render said thyristor conducting and to thereby close said shunt path.

5. A capacitor discharge ignition system including a storage capacitor connected to the primary of an ignition transformer, a capacitor charging device delivering alternating current and having first and second terminals, one of said terminals of said charging device being connected to one terminal of said capacitor, a first diode connected to the other of said terminals of said charging device and to the other terminal of said capacitor, a thyristor connected to said first and second terminals of said charging device in parallel with said capacitor and having a gate, and a zener diode connected to said one of said terminals of said charging device and to said gate of said thyristor.

PO-1050
(5/69)

UNITED STATES PATENT OFFICE
CERTIFICATE OF CORRECTION

Patent No. 3,593,063                     Dated July 13, 1971

Inventor(s) David T. Cavil

It is certified that error appears in the above-identified patent and that said Letters Patent are hereby corrected as shown below:

Column 2, line 3     "cathode" should be --- anode 44 ---;

Column 2, line 7     "outer" should be --- other ---.

Signed and sealed this 25th day of January 1972.

SEAL)
ttest:

DWARD M. FLETCHER, JR.            ROBERT GOTTSCHALK
ttesting Officer                  Commissioner of Patents